US011571780B2

(12) United States Patent
Xue et al.

(10) Patent No.: US 11,571,780 B2
(45) Date of Patent: Feb. 7, 2023

(54) MULTI-STATION WHEEL DEBURRING DEVICE

(71) Applicant: CITIC Dicastal CO., LTD., Hebei (CN)

(72) Inventors: Bowen Xue, Qinhuangdao (CN); Xinhan Liu, Qinhuangdao (CN); Haifeng Yuan, Qinhuangdao (CN); Jiandong Guo, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 1086 days.

(21) Appl. No.: 16/223,394

(22) Filed: Dec. 18, 2018

(65) Prior Publication Data
US 2019/0321931 A1    Oct. 24, 2019

(30) Foreign Application Priority Data
Apr. 19, 2018    (CN) .......................... 201810352086.2

(51) Int. Cl.
| B24B 27/00 | (2006.01) |
| B24B 29/00 | (2006.01) |
| B24B 41/02 | (2006.01) |
| B24B 41/06 | (2012.01) |
| B24B 5/44 | (2006.01) |
| B24B 47/12 | (2006.01) |
| B24B 9/04 | (2006.01) |

(52) U.S. Cl.
CPC .................. *B24B 9/04* (2013.01); *B24B 5/44* (2013.01); *B24B 27/0076* (2013.01); *B24B 29/005* (2013.01); *B24B 41/02* (2013.01); *B24B 41/06* (2013.01); *B24B 47/12* (2013.01)

(58) Field of Classification Search
CPC ....... B24B 41/067; B24B 41/06; B24B 41/02; B24B 5/44; B24B 5/46; B24B 5/366; B24B 29/005; B24B 27/0076; B24B 27/0069; B24B 19/28; B24B 21/008; B23B 2215/08; B23B 2220/08; B23B 5/28; B60B 2310/234; B08B 1/04
See application file for complete search history.

(56) References Cited

U.S. PATENT DOCUMENTS

| 10,160,085 B2* | 12/2018 | Xue ........................ B24B 29/04 |
| 2016/0184958 A1* | 6/2016 | Xue ..................... B24B 29/005 |
| | | 451/283 |
| 2020/0139504 A1* | 5/2020 | Li ............................ B24B 9/04 |

* cited by examiner

Primary Examiner — Joel D Crandall
Assistant Examiner — Makena S Markman
(74) Attorney, Agent, or Firm — Cooper Legal Group, LLC

(57) ABSTRACT

A multi-station wheel deburring device is disclosed, which consists of a lower lifting translation system, a first brush system, a second brush system, a synchronous clamping drive system and a third brush system, etc. The multi-station wheel deburring device can be used for removing burrs from the root of a wheel flange, a center hole, bolt holes and a back cavity, can automatically adjust the position of each brush according to the dimension and shape of a wheel, and at the same time, has the characteristics of high automation, high removal efficiency, advanced technology, strong universality and high safety and stability.

1 Claim, 4 Drawing Sheets

MULTI-STATION WHEEL DEBURRING DEVICE

CROSS-REFERENCE TO RELATED APPLICATIONS

The present application claims benefit of Chinese Patent Application No. 201810352086.2, filed on Apr. 19, 2018, the contents of which are hereby incorporated by reference in its entirety.

BACKGROUND

In the machining process of an aluminum alloy wheel, burrs are produced at the root of a wheel flange, a center hole, bolt holes and a back cavity. If the produced burrs are not removed in time, the subsequent coating effect will be seriously affected, and even the wheel is corroded in advance during use. In addition, the dimensions of wheels operated on a logistics roller bed and the shapes of the back cavities are different due to the mixed-line production. Therefore, a multifunctional and general-purpose automatic deburring device is needed to remove burrs from these parts of the wheel.

SUMMARY

The present disclosure relates to a deburring device, specifically to a multi-station wheel deburring device.

The objective of the present disclosure is to provide a multi-station wheel deburring device, which can be used for removing burrs from the root of a wheel flange, a center hole, bolt holes and a back cavity, and can automatically adjust the position of each brush according to the dimension and shape of a wheel.

In order to achieve the above objective, the technical solution of the present disclosure is as follows.

A multi-station wheel deburring device, consisting of a frame, first cylinders, guide pillars, guide sleeves, a lower fixing plate, a lower lifting plate, a first guide rail, a lower sliding table, a first belt pulley, a first shaft, a first bearing seat, a swivel, a servo electric first cylinder, a second guide rail, a first servo motor, a first lifting table, a third guide rail, a second servo motor, a transition plate, a second bearing seat, a third servo motor, a second shaft, a roll-over stand, a fourth servo motor, a first brush, a first sliding plate, a first rack, a first gear, a first bolt, a turntable, a fourth guide rail, a second bolt, an upper sliding table, a second belt pulley, a third bearing seat, a third shaft, a second brush, a fifth servo motor, a first synchronous belt, a third belt pulley, a second rack, a second gear, a sixth servo motor, a fifth guide rail, a second lifting table, a second servo electric cylinder, a second cylinder, an upper fixing plate, third racks, an upper guide rail, a left sliding plate, left bearing seats, left shafts, V-shaped rollers, right shafts, right bearing seats, a right sliding plate, a seventh servo motor, third bolts, a sixth guide rail, a base plate, a fourth servo electric cylinder, seventh guide rails, telescopic plates, eighth guide rails, brush bundles, fifth servo electric cylinders, fourth racks, fourth gears, ninth servo motors, a eighth servo motor, a second synchronous belt, a fourth belt pulley, a third servo electric cylinder and a third gear, in which a lower lifting translation system comprises: the two first cylinders and the four guide sleeves are all fixed below the lower fixing plate; the output ends of the first cylinders are hinged with the lower part of the lower lifting plate; the four guide pillars matched with the four guide sleeves are fixed below the lower lifting plate; the lower sliding table is mounted above the lower lifting plate via the first guide rail; the third servo electric cylinder is fixed on the right side above the lower lifting plate, and the output end thereof is connected to the right side of the lower sliding table; the eighth servo motor is fixed above a top plate of the lower sliding table, and the fourth belt pulley is fixed at the output end thereof; the first bearing seat is fixed above the top plate of the lower sliding table; the first shaft is mounted inside the first bearing seat via a bearing; the swivel is mounted outside the first bearing seat via a bearing; the first belt pulley is fixed at the lower end of the first shaft; the first belt pulley is connected to the fourth belt pulley via the second synchronous belt;

a first brush system comprises: the side of the first lifting table is mounted on the left side of the swivel via the second guide rail; the servo electric first cylinder is fixed below the swivel, and the output end thereof is connected to the lower right part of the first lifting table; the first servo motor is fixed below the first lifting table, and the first gear is fixed at the output end thereof; the first sliding plate is mounted above the first lifting table via the third guide rail; the first rack is fixed on the right side of the first sliding plate and engaged with the first gear; the second bearing seat is mounted above the transition plate; the side of the second bearing seat is hinged with one end of the first sliding plate; the third servo motor is fixed to the side of the first sliding plate, and the output end thereof is connected to the second bearing seat; the second shaft is mounted inside the second bearing seat via a bearing; the second servo motor is fixed below the transition plate, and the output end thereof is connected to the lower part of the second shaft; the roll-over stand is fixed above the second shaft; the first brush is mounted above the roll-over stand; the fourth servo motor is fixed to the side of the roll-over stand, and the output end thereof is connected to one side of the first brush; the first bolt is fixed on the right side above the first lifting table, and cooperates with a hole in the turntable; the turntable is fixed at the top of the first shaft;

a second brush system comprises: the left side of the second lifting table is mounted on the right side of the swivel via the fourth guide rail; the second servo electric cylinder is fixed below the swivel, and the output end thereof is connected to the lower left part of the second lifting table; the sliding table is mounted above the second lifting table via the fifth guide rail; the fifth servo motor is fixed to the right side above the upper sliding table, and the third belt pulley is fixed at the output end thereof; the third bearing seat is fixed to the left side above the upper sliding table; the third shaft is mounted inside the third bearing seat via a bearing; the second brush is fixed above the third shaft; the second belt pulley is fixed below the third shaft; the second belt pulley is connected to the third belt pulley via the first synchronous belt; the second rack is fixed to the right side of the upper sliding table; the sixth servo motor is fixed to the right side of the second lifting table, and the second gear is fixed at the output end thereof; the second gear is engaged with the second rack; the second bolt is fixed to the left side above the second lifting table;

a synchronous clamping drive system comprises: the upper fixing plate is fixed at the upper part of the frame; the third gear is fixed in the middle above the upper fixing plate; the left sliding plate is mounted above the upper fixing plate via the upper guide rail; the two left bearing seats are fixed above the left sliding plate; the two left shafts are mounted inside the left bearing seats via bearings; the V-shaped rollers are fixed above the two left shafts; the two right bearing seats are fixed above the right sliding plate; the two right shafts are mounted inside the right bearing seats via bearings; the V-shaped rollers are fixed above the two right shafts; the seventh servo motor is fixed below the right sliding plate, and the output end thereof is connected to one of the right shafts; the second cylinder is fixed above the upper fixing plate, and the output end thereof is connected to the left sliding plate; a third rack is fixed below the left sliding plate and the right sliding plate respectively, and the two third racks are engaged with the third gear at the same time;

a third brush system comprises: a side of the base plate is mounted on a side of the swivel via the sixth guide rail; the fourth servo electric cylinder is fixed below the swivel, and the output end thereof is connected to the lower side of the base plate; the third bolt is fixed to the top of the base plate, and matches a hole in the turntable; the telescopic plate is mounted on the side of the base plate via the seventh guide rail; a plurality of brush bundles are mounted on the side of the telescopic plate via the eighth guide rail; a plurality of fifth servo electric cylinders are fixed to the bottom of the telescopic plate, and the output ends thereof are connected to the respective brush bundles; the ninth servo motor is fixed to the bottom of the base plate, and the fourth gear is fixed to the output end thereof; the fourth rack is fixed to the left side of the telescopic plate and engaged with the fourth gear; and the device comprises two sets of left and right symmetrical third brush systems.

In actual use, the second cylinder synchronously clamps a wheel via the upper guide rail, the third gear, the third racks and the four V-shaped rollers; the seventh servo motor rotates by driving one of the right shafts, so that the clamped wheel rotates; the fourth servo motor drives the first brush to rotate in the circumferential direction; the second servo motor can drive the roll-over stand and the first brush to rotate via the second shaft; the third servo motor can adjust the angle of the first brush; the first servo motor can adjust the horizontal position of the first brush via the first gear, the first rack and the third guide rail; the servo electric first cylinder drives the first lifting table to ascend via the second guide rail, and the first bolt cooperates with the hole in the turntable; the fifth servo motor drives the third shaft and the second brush to rotate via the third belt pulley, the second belt pulley and the first synchronous belt; the sixth servo motor drives the upper sliding table and the second brush to ascend via the second gear, the second rack and the fifth guide rail; the second bolt cooperates with the turntable; the second servo electric cylinder drives the second lifting table and the second brush to ascend via the fourth guide rail; the ninth servo motor can drive the telescopic plates and the plurality of brush bundles to move horizontally via the fourth gears, the fourth racks and the seventh guide rails; the fifth servo electric cylinders can adjust the heights of the respective brush bundles via the eighth guide rails to adapt to a back cavity of the wheel; the third bolts cooperate with the turntable; the fourth servo electric cylinder can adjust the height of the base plate via the sixth guide rail; the first cylinders can drive the first brush, the second brush and the respective brush bundles to move up and down integrally via the guide pillars and the guide sleeves; the third servo electric cylinder can drive the first brush, the second brush and the respective brush bundles to move horizontally integrally via the first guide rail; the eighth servo motor can drive the first shaft to rotate via the fourth belt pulley, the first belt pulley and the second synchronous belt, thereby driving the turntable, the first brush system, the second brush system and the third brush system to rotate; through the up-down movement and horizontal movement, the first brush can remove burrs from the root of a wheel flange and corners; the second brush can remove burrs from a center hole and bolt holes; and the brush bundles can remove burrs from the back cavity of the wheel.

The multi-station wheel deburring device can be used for removing burrs from the root of a wheel flange, a center hole, bolt holes and a back cavity, can automatically adjust the position of each brush according to the dimension and shape of a wheel, and at the same time, has the characteristics of high automation, high removal efficiency, advanced technology, strong universality and high safety and stability.

LIST OF REFERENCE SYMBOLS

Figure 1:
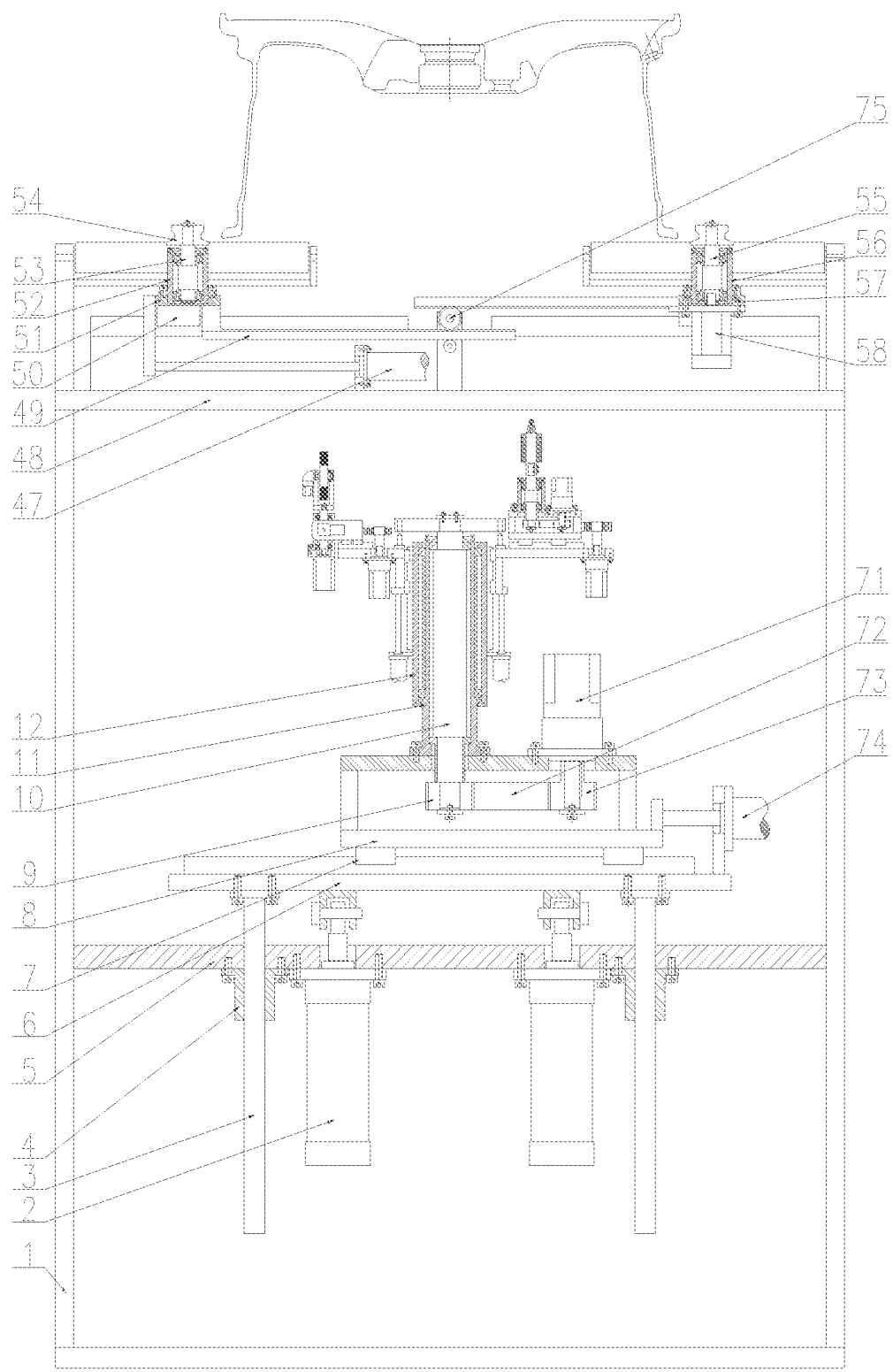
FIG. 1 is a front view of a multi-station wheel deburring device according to the present disclosure.
Figure 2:
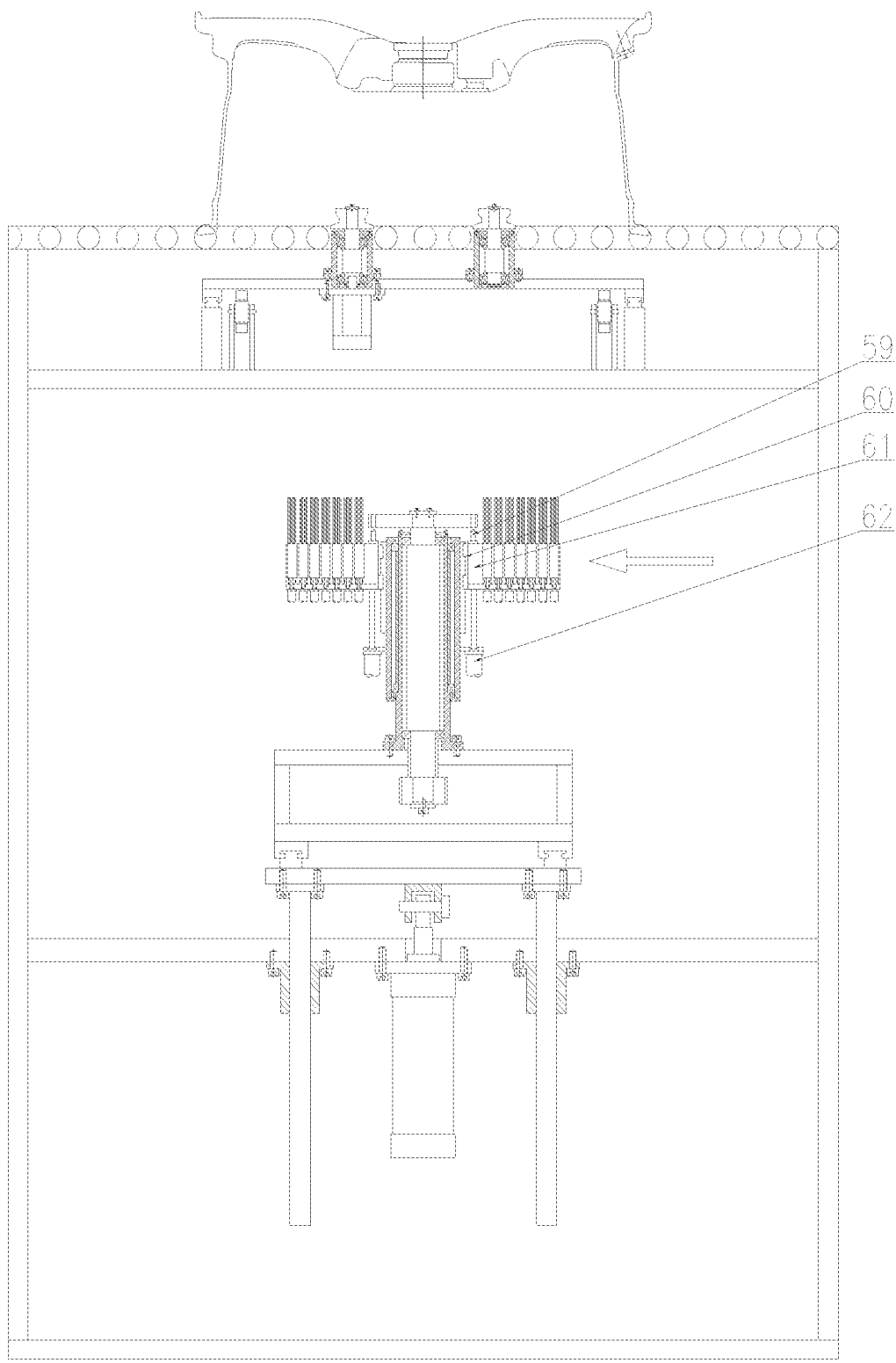
FIG. 2 is a left view of the multi-station wheel deburring device according to the present disclosure.
Figure 3:
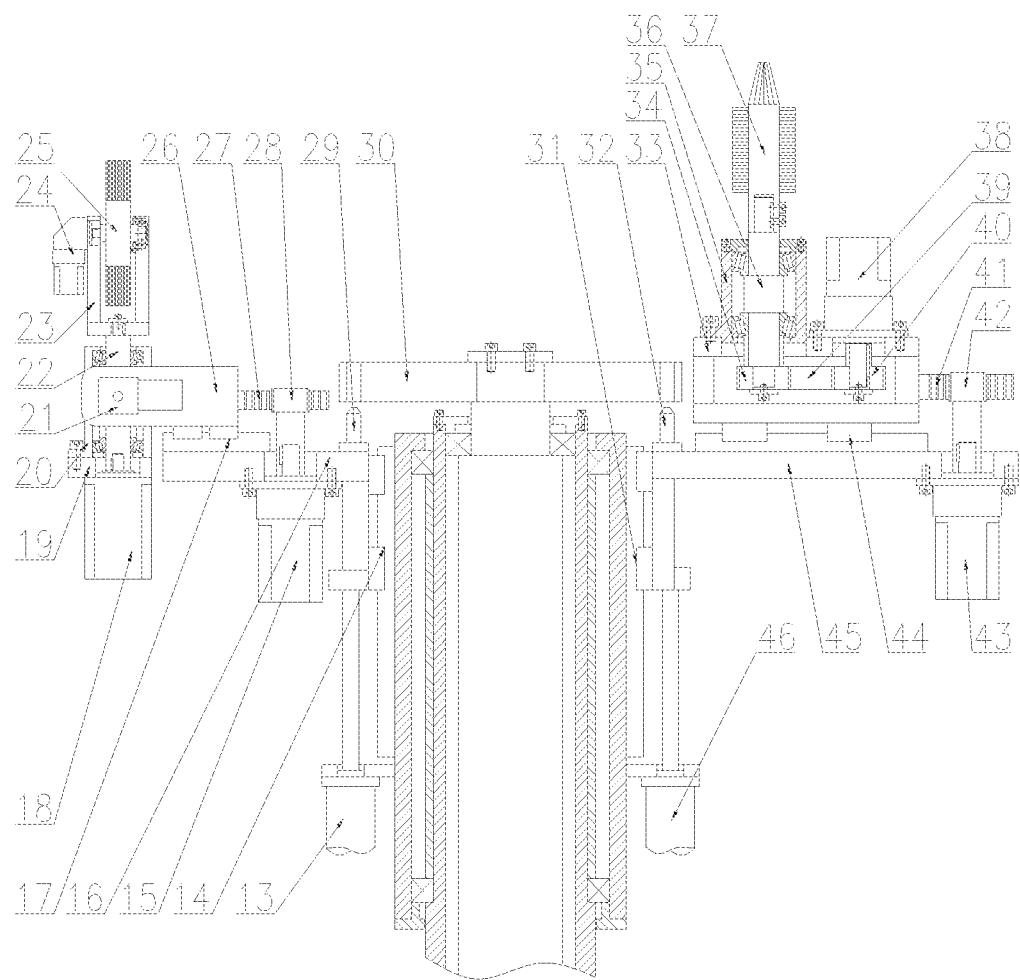
FIG. 3 is a partial front view of a first brush system and a second brush system of the multi-station wheel deburring device according to the present disclosure.
Figure 4:
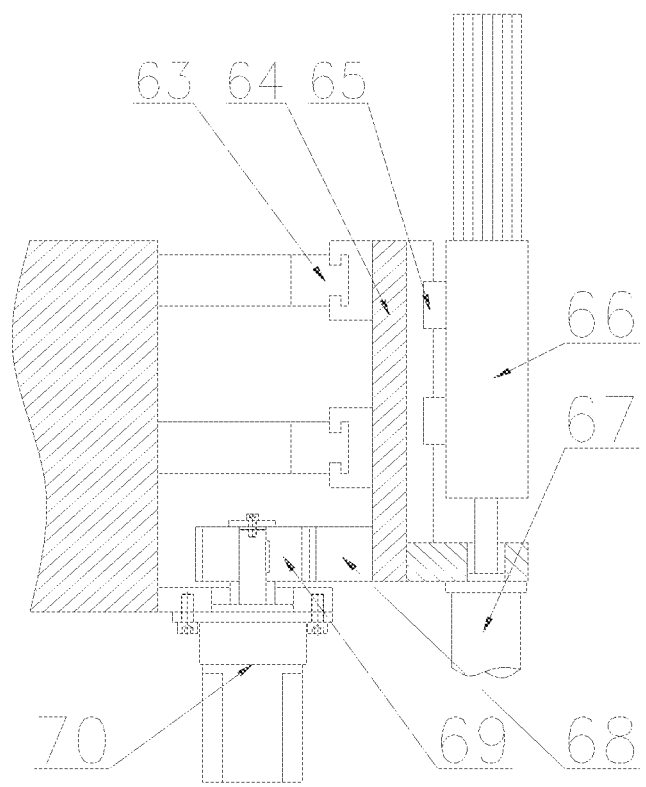
FIG. 4 is a partial front view of a third brush system of the multi-station wheel deburring device according to the present disclosure.

1—frame, 2—first cylinder, 3—guide pillar, 4—guide sleeve, 5—lower fixing plate, 6—lower lifting plate, 7—first guide rail, 8—lower sliding table, 9—first belt pulley, 10—first shaft, 11—first bearing seat, 12—swivel, 13—servo electric first cylinder, 14—second guide rail, 15—first servo motor, 16—first lifting table, 17—third guide rail, 18—second servo motor, 19—transition plate, 20—second bearing seat, 21—third servo motor, 22—second shaft, 23—roll—over stand, 24—fourth servo motor, 25—first brush, 26—first sliding plate, 27—first rack, 28—first gear, 29—first bolt, 30—turntable, 31—fourth guide rail, 32—second bolt, 33—upper sliding table, 34—second belt pulley, 35—third bearing seat, 36—third shaft, 37—second brush, 38—fifth servo motor, 39—first synchronous belt, 40—third belt pulley, 41—second rack, 42—second gear, 43—sixth servo motor, 44—fifth guide rail, 45—second lifting table, 46—second servo electric cylinder, 47—second cylinder, 48—upper fixing plate, 49—third rack, 50—upper guide rail, 51—left sliding plate, 52—left bearing seat, 53—left shaft, 54—V-shaped roller, 55—right shaft, 56—right bearing seat, 57—right sliding plate, 58—seventh servo motor, 59—third bolt, 60—sixth guide rail, 61—base plate, 62—fourth servo electric cylinder, 63—seventh guide rail, 64—telescopic plate, 65—eighth guide rail, 66—brush bundle, 67—fifth servo electric cylinder, 68—fourth rack, 69—fourth gear, 70—ninth servo motor, 71—eighth servo motor, 72—second synchronous belt, 73—fourth belt pulley, 74—third servo electric cylinder, 75—third gear.

DETAILED DESCRIPTION

The details and working conditions of the specific device according to the present disclosure will be described below in combination with the drawings.

A multi-station wheel deburring device, consisting of a frame 1, first cylinders 2, guide pillars 3, guide sleeves 4, a lower fixing plate 5, a lower lifting plate 6, a first guide rail 7, a lower sliding table 8, a first belt pulley 9, a first shaft 10, a first bearing seat 11, a swivel 12, a servo electric first cylinder 13, a second guide rail 14, a first servo motor 15, a first lifting table 16, a third guide rail 17, a second servo motor 18, a transition plate 19, a second bearing seat 20, a third servo motor 21, a second shaft 22, a roll-over stand 23, a fourth servo motor 24, a first brush 25, a first sliding plate 26, a first rack 27, a first gear 28, a first bolt 29, a turntable 30, a fourth guide rail 31, a second bolt 32, an upper sliding table 33, a second belt pulley 34, a third bearing seat 35, a third shaft 36, a second brush 37, a fifth servo motor 38, a first synchronous belt 39, a third belt pulley 40, a second rack 41, a second gear 42, a sixth servo motor 43, a fifth guide rail 44, a second lifting table 45, a second servo electric cylinder 46, a second cylinder 47, an upper fixing plate 48, third racks 49, an upper guide rail 50, a left sliding plate 51, left bearing seats 52, left shafts 53, V-shaped rollers 54, right shafts 55, right bearing seats 56, a right sliding plate 57, a seventh servo motor 58, third bolts 59, a sixth guide rail 60, a base plate 61, a fourth servo electric cylinder 62, seventh guide rails, telescopic plates 64, eighth guide rails 65, brush bundles 66, fifth servo electric cylinders 67, fourth racks 68, fourth gears 69, ninth servo motors 70, a eighth servo motor 71, a second synchronous belt 72, a fourth belt pulley 73, a third servo electric cylinder 74 and a third gear 75, in which a lower lifting translation system comprises: the two first cylinders 2 and the four guide sleeves 4 are all fixed below the lower fixing plate 5; the output ends of the first cylinders 2 are hinged with the lower part of the lower lifting plate 6; the four guide pillars 3 matched with the four guide sleeves 4 are fixed below the lower lifting plate 6; the lower sliding table 8 is mounted above the lower lifting plate 6 via the first guide rail 7; the third servo electric cylinder 74 is fixed on the right side above the lower lifting plate 6, and the output end thereof is connected to the right side of the lower sliding table 8; the eighth servo motor 71 is fixed above a top plate of the lower sliding table 8, and the fourth belt pulley 73 is fixed at the output end thereof; the first bearing seat 11 is fixed above the top plate of the lower sliding table 8; the first shaft 10 is mounted inside the first bearing seat 11 via a bearing; the swivel 12 is mounted outside the first bearing seat 11 via a bearing; the first belt pulley 9 is fixed at the lower end of the first shaft 10; the first belt pulley 9 is connected to the fourth belt pulley 73 via the second synchronous belt 72;

a first brush system comprises: the side of the first lifting table 16 is mounted on the left side of the swivel 12 via the second guide rail 14; the servo electric first cylinder 13 is fixed below the swivel 12, and the output end thereof is connected to the lower right part of the first lifting table 16; the first servo motor 15 is fixed below the first lifting table 16, and the first gear 28 is fixed at the output end thereof; the first sliding plate 26 is mounted above the first lifting table 16 via the third guide rail 17; the first rack 27 is fixed on the right side of the first sliding plate 26 and engaged with the first gear 28; the second bearing seat 20 is mounted above the transition plate 19; the side of the second bearing seat 20 is hinged with one end of the first sliding plate 26; the third servo motor 21 is fixed to the side of the first sliding plate 26, and the output end thereof is connected to the second bearing seat 20; the second shaft 22 is mounted inside the second bearing seat 20 via a bearing; the second servo motor 18 is fixed below the transition plate 19, and the output end thereof is connected to the lower part of the second shaft 22; the roll-over stand 23 is fixed above the second shaft 22; the first brush 25 is mounted above the roll-over stand 23; the fourth servo motor 24 is fixed to the side of the roll-over stand 23, and the output end thereof is connected to one side of the first brush 25; the first bolt 29 is fixed on the right side above the first lifting table 16, and cooperates with a hole in the turntable 30; the turntable 30 is fixed at the top of the first shaft 10;

a second brush system comprises: the left side of the second lifting table 45 is mounted on the right side of the swivel 12 via the fourth guide rail 31; the second servo electric cylinder 46 is fixed below the swivel 12, and the output end thereof is connected to the lower left part of the second lifting table 45; the sliding table 33 is mounted above the second lifting table 45 via the fifth guide rail 44; the fifth servo motor 38 is fixed to the right side above the upper sliding table 33, and the third belt pulley 40 is fixed at the output end thereof; the third bearing seat 35 is fixed to the left side above the upper sliding table 33; the third shaft 36 is mounted inside the third bearing seat 35 via a bearing; the second brush 37 is fixed above the third shaft 36; the second belt pulley 34 is fixed below the third shaft 36; the second belt pulley 34 is connected to the third belt pulley 40 via the first synchronous belt 39; the second rack 41 is fixed to the right side of the upper sliding table 33; the sixth servo motor 43 is fixed to the right side of the second lifting table 45, and the second gear 42 is fixed at the output end thereof; the second gear 42 is engaged with the second rack 41; the second bolt 32 is fixed to the left side above the second lifting table 45;

a synchronous clamping drive system comprises: the upper fixing plate 48 is fixed at the upper part of the frame 1; the third gear 75 is fixed in the middle above the upper fixing plate 48; the left sliding plate 51 is mounted above the upper fixing plate 48 via the upper guide rail 50; the two left bearing seats 52 are fixed above the left sliding plate 51; the two left shafts 53 are mounted inside the left bearing seats 52 via bearings; the V-shaped rollers 54 are fixed above the two left shafts 53; the two right bearing seats 56 are fixed above the right sliding plate 57; the two right shafts 55 are mounted inside the right bearing seats 56 via bearings; the V-shaped rollers 54 are fixed above the two right shafts 55; the seventh servo motor 58 is fixed below the right sliding plate 57, and the output end thereof is connected to one of the right shafts 55; the second cylinder 47 is fixed above the upper fixing plate 48, and the output end thereof is connected to the left sliding plate 51; a third rack 49 is fixed below the left sliding plate 51 and the right sliding plate 57 respectively, and the two third racks 49 are engaged with the third gear 75 at the same time;

a third brush system comprises: a side of the base plate 61 is mounted on a side of the swivel 12 via the sixth guide rail 60; the fourth servo electric cylinder 62 is fixed below the swivel 12, and the output end thereof is connected to the lower side of the base plate 61; the third bolt 59 is fixed to the top of the base plate 61, and matches a hole in the turntable 30; the telescopic plate 64 is mounted on the side of the base plate 61 via the seventh guide rail 63; a plurality of brush bundles 66 are mounted on the side of the telescopic plate 64 via the eighth guide rail 65; a plurality of fifth servo electric cylinders 67 are fixed to the bottom of the telescopic plate 64, and the output ends thereof are connected to the respective brush bundles 66; the ninth servo motor 70 is fixed to the bottom of the base plate 61, and the fourth gear 69 is fixed to the output end thereof; the fourth rack 68 is fixed to the left side of the telescopic plate 64 and engaged with the fourth gear 69; and the device comprises two sets of left and right symmetrical third brush systems.

In the working process, the second cylinder 47 synchronously clamps a wheel via the upper guide rail 50, the third gear 75, the third racks 49 and the four V-shaped rollers 54; the seventh servo motor 58 rotates by driving one of the right shafts 55, so that the clamped wheel rotates; the fourth servo motor 24 drives the first brush 25 to rotate in the circumferential direction; the second servo motor 18 can drive the roll-over stand 23 and the first brush 25 to rotate via the second shaft 22; the third servo motor 21 can adjust the angle of the first brush 25; the first servo motor 15 can adjust the horizontal position of the first brush 25 via the first gear 28, the first rack 27 and the third guide rail 17; the servo electric first cylinder 13 drives the first lifting table 16 to ascend via the second guide rail 14, and the first bolt 29 cooperates with the hole in the turntable 30; the fifth servo motor 38 drives the third shaft 36 and the second brush 37 to rotate via the third belt pulley 40, the second belt pulley 34 and the first synchronous belt 39; the sixth servo motor 43 drives the upper sliding table 33 and the second brush 37 to ascend via the second gear 42, the second rack 41 and the fifth guide rail 44; the second bolt 32 cooperates with the turntable 30; the second servo electric cylinder 46 drives the second lifting table 45 and the second brush 37 to ascend via the fourth guide rail 31; the ninth servo motor 70 can drive the telescopic plates 64 and the plurality of brush bundles 66 to move horizontally via the fourth gears 69, the fourth racks 68 and the seventh guide rails; the fifth servo electric cylinders 67 can adjust the heights of the respective brush bundles 66 via the eighth guide rails 65 to adapt to a back cavity of the wheel; the third bolts 59 cooperate with the turntable 30; the fourth servo electric cylinder 62 can adjust the height of the base plate 61 via the sixth guide rail 60; the first cylinders 2 can drive the first brush 25, the second brush 37 and the respective brush bundles 66 to move up and down integrally via the guide pillars 3 and the guide sleeves 4; the third servo electric cylinder 74 can drive the first brush 25, the second brush 37 and the respective brush bundles 66 to move horizontally integrally via the first guide rail 7; the eighth servo motor 71 can drive the first shaft 10 to rotate via the fourth belt pulley 73, the first belt pulley 9 and the second synchronous belt 72, thereby driving the turntable 30, the first brush system, the second brush system and the third brush system to rotate; through the up-down movement and horizontal movement, the first brush 25 can remove burrs from the root of a wheel flange and corners; the second brush 37 can remove burrs from a center hole and bolt holes; and the brush bundles 66 can remove burrs from the back cavity of the wheel.

The invention claimed is:

1. A multi-station wheel deburring device, consisting of:
    a frame, two first cylinders, four guide pillars, four guide sleeves, a lower fixing plate, a lower lifting plate, a first guide rail, a lower sliding table, a first belt pulley, a first shaft, a first bearing seat, a swivel, a servo electric first cylinder, a second guide rail, a first servo motor, a first lifting table, a third guide rail, a second servo motor, a transition plate, a second bearing seat, a third servo motor, a second shaft, a roll-over stand, a fourth servo motor, a first brush, a first sliding plate, a first rack, a first gear, a first bolt, a turntable, a fourth guide rail, a second bolt, an upper sliding table, a second belt pulley, a third bearing seat, a third shaft, a second brush, a fifth servo motor, a first synchronous belt, a third belt pulley, a second rack, a second gear, a sixth servo motor, a fifth guide rail, a second lifting table, a second servo electric cylinder, a second cylinder, an upper fixing plate, two third racks, an upper guide rail, a left sliding plate, two left bearing seats, two left shafts, V-shaped rollers, two right shafts, two right bearing seats, a right sliding plate, a seventh servo motor, a third bolts, a sixth guide rail, a base plate, a fourth servo electric cylinder, a seventh guide rails, a telescopic plates, an eighth guide rails, a plurality of brush bundles, a plurality of fifth servo electric cylinders, a fourth racks, a fourth gears, a ninth servo motors, an eighth servo motor, a second synchronous belt, a fourth belt pulley, a third servo electric cylinder and a third gear, wherein
    a lower lifting translation system comprises:
        the two first cylinders and the four guide sleeves are all fixed below the lower fixing plate;
        output ends of the two first cylinders are hinged with a lower part of the lower lifting plate;
        the four guide pillars matched with the four guide sleeves are fixed below the lower lifting plate;
        the lower sliding table is mounted above the lower lifting plate via the first guide rail;
        the third servo electric cylinder is fixed on a right side above the lower lifting plate, and an output end thereof is connected to a right side of the lower sliding table;
        the eighth servo motor is fixed above a top plate of the lower sliding table, and the fourth belt pulley is fixed at an output end thereof;
        the first bearing seat is fixed above the top plate of the lower sliding table;
        the first shaft is mounted inside the first bearing seat via a first bearing;
        the swivel is mounted outside the first bearing seat via a second bearing;
        the first belt pulley is fixed at a lower end of the first shaft;
        the first belt pulley is connected to the fourth belt pulley via the second synchronous belt;
    a first brush system comprises:
        a side of the first lifting table is mounted on a left side of the swivel via the second guide rail;
        the servo electric first cylinder is fixed below the swivel, and an output end thereof is connected to a lower right part of the first lifting table;
        the first servo motor is fixed below the first lifting table, and the first gear is fixed at an output end thereof;
        the first sliding plate is mounted above the first lifting table via the third guide rail;
        the first rack is fixed on a right side of the first sliding plate and engaged with the first gear;
        the second bearing seat is mounted above the transition plate;
        a side of the second bearing seat is hinged with one end of the first sliding plate;
        the third servo motor is fixed to a side of the first sliding plate, and an output end thereof is connected to the second bearing seat;
        the second shaft is mounted inside the second bearing seat via a third bearing;
        the second servo motor is fixed below the transition plate, and an output end thereof is connected to a lower part of the second shaft;
        the roll-over stand is fixed above the second shaft;
        the first brush is mounted above the roll-over stand;
        the fourth servo motor is fixed to a side of the roll-over stand, and an output end thereof is connected to one side of the first brush;
        the first bolt is fixed on a right side above the first lifting table, and cooperates with a hole in the turntable;
        the turntable is fixed at a top of the first shaft;
    a second brush system comprises:

a left side of the second lifting table is mounted on a right side of the swivel via the fourth guide rail;

the second servo electric cylinder is fixed below the swivel, and an output end thereof is connected to a lower left part of the second lifting table;

the upper sliding table is mounted above the second lifting table via the fifth guide rail;

the fifth servo motor is fixed to a right side above the upper sliding table, and the third belt pulley is fixed at an output end thereof;

the third bearing seat is fixed to a left side above the upper sliding table;

the third shaft is mounted inside the third bearing seat via a fourth bearing;

the second brush is fixed above the third shaft;

the second belt pulley is fixed below the third shaft;

the second belt pulley is connected to the third belt pulley via the first synchronous belt;

the second rack is fixed to a right side of the upper sliding table;

the sixth servo motor is fixed to a right side of the second lifting table, and the second gear is fixed at an output end thereof;

the second gear is engaged with the second rack;

the second bolt is fixed to a left side above the second lifting table;

a synchronous clamping drive system comprises:

the upper fixing plate is fixed at an upper part of the frame;

the third gear is fixed in a middle above the upper fixing plate;

the left sliding plate is mounted above the upper fixing plate via the upper guide rail;

the two left bearing seats are fixed above the left sliding plate;

the two left shafts are mounted inside the two left bearing seats via fifth bearings;

the V-shaped rollers are fixed above the two left shafts;

the two right bearing seats are fixed above the right sliding plate;

the two right shafts are mounted inside the two right bearing seats via sixth bearings;

the V-shaped rollers are fixed above the two right shafts;

the seventh servo motor is fixed below the right sliding plate, and an output end thereof is connected to one of the two right shafts;

the second cylinder is fixed above the upper fixing plate, and an output end thereof is connected to the left sliding plate;

one of the two third racks is fixed below the left sliding plate and a second of the two third racks is fixed below the right sliding plate, and the two third racks are engaged with the third gear at the same time;

a third brush system comprises:

a side of the base plate is mounted on a side of the swivel via the sixth guide rail;

the fourth servo electric cylinder is fixed below the swivel, and an output end thereof is connected to a lower side of the base plate;

the third bolt is fixed to a top of the base plate, and matches the hole in the turntable;

the telescopic plate is mounted on the side of the base plate via the seventh guide rail;

the plurality of brush bundles are mounted on a side of the telescopic plate via the eighth guide rail;

the plurality of fifth servo electric cylinders are fixed to a bottom of the telescopic plate, and output ends thereof are connected to a respective one of the plurality of brush bundles;

the ninth servo motor is fixed to a bottom of the base plate, and the fourth gear is fixed to an output end thereof;

the fourth rack is fixed to a left side of the telescopic plate and engaged with the fourth gear; and wherein there are two sets of left and right symmetrical third brush systems.

* * * * *